June 3, 1969  H. NERWIN  3,447,867
FOCUS COMPENSATING MECHANISM FOR SINGLE FRAME PROJECTION
Original Filed March 8, 1966
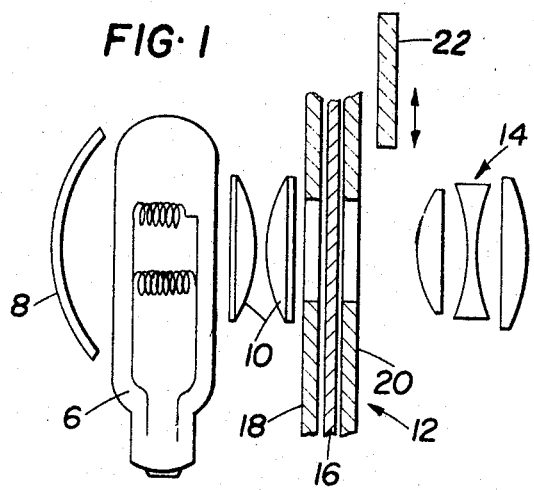
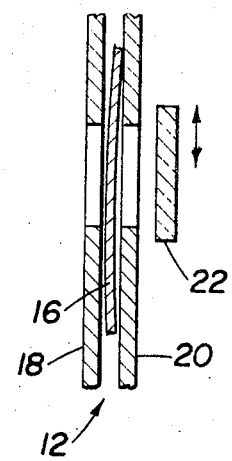
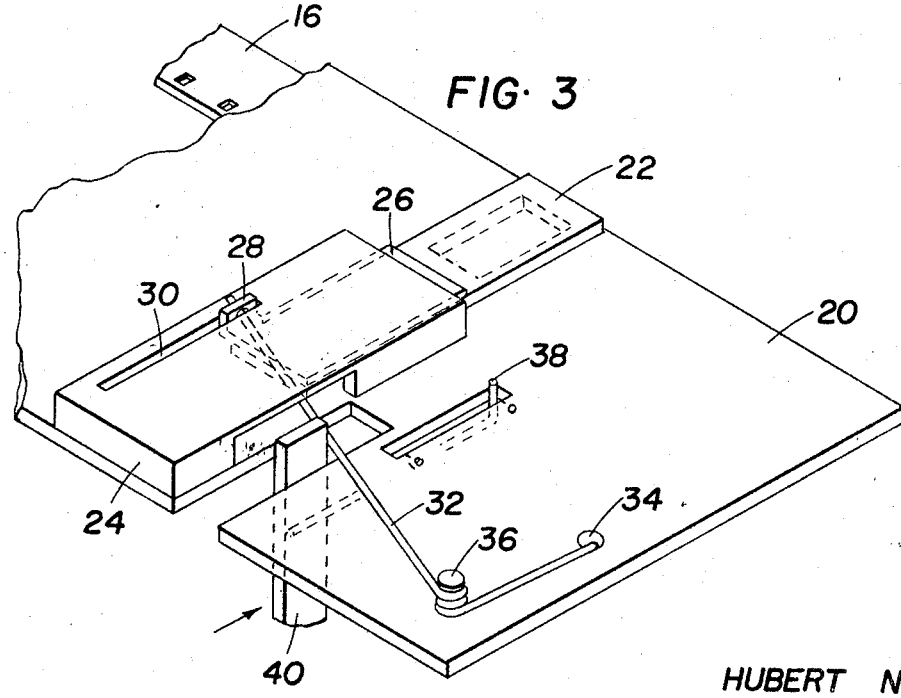
HUBERT NERWIN
INVENTOR.
BY Robert W. Hampton
Steve W. Greenbaum
ATTORNEYS

3,447,867
FOCUS COMPENSATING MECHANISM FOR SINGLE FRAME PROJECTION

Hubert Nerwin, Rochester, N.Y., assignor to Eastman Kodak Company, Rochester, N.Y., a corporation of New Jersey
Continuation of application Ser. No. 532,688, Mar. 8, 1966. This application June 3, 1968, Ser. No. 739,926
Int. Cl. G03b 3/00
U.S. Cl. 352—140                 5 Claims This application is a continuation of application Ser. No. 532,688, filed Mar. 8, 1966, now abandoned.

This invention relates generally to moving picture projectors, and more specifically to a focus compensating mechanism for a moving picture projector to compensate for focus shift resulting from film buckling occurring during single frame projection.

It is well known in the moving picture projector art to provide single frame projection as well as moving pictures in forward and reverse directions. During such single frame projection, the single frame of film in the projection gate is exposed to intense heat from the projection lamp. To prevent the film from burning, such projectors are normally equipped with a heat absorbing glass plate which is insertable in the optic axis between the projection lamp and the film gate. This heat absorbing plate in combination with the normal gate cooling apparatus of the projector prevents the single frame of film from burning, but may not prevent film buckling. The film buckling is due to the emulsion layer of the film drying out causing the film to shrink and buckle toward the projection lamp. Although a heat absorbing plate of this type is successful to prevent the film from burning, it has the disadvantage of being unable, due to its location between the lamp and film gate among other things, to compensate for any focus shift occurring during single frame projection. An additional disadvantage of the heat absorbing plate is that it greatly reduces the amount of projection light passing through the single frame with the result that the quality of the projected picture is greatly impaired. Applicant's invention is believed to overcome these and other disadvantages of prior known motion picture projectors.

One of the objects of the present invention is to provide an improved focus compensating mechanism for a moving picture projector to compensate for focus shift resulting from film buckling during single frame projection.

Another object of the invention is to provide a moving picture projector in which the projection light is not reduced during single frame projection.

Another object of the invention is to provide a moving picture projector in which the insertion of a heat absorbing plate in the optic path may be eliminated for single frame projection.

Another object of the invention is to provide in a moving picture projector a focus compensating mechanism for single frame projection that is of simple design and construction, thoroughly reliable and efficient in operation, and economical to manufacture.

To attain these objects, applicant's invention includes within its scope an improved motion picture projector having a focus compensating mechanism to compensate for focus shift resulting from film buckling during single frame projection. The focus compensating mechanism comprises an optical compensating member interposed between the film gate and the objective lens system during single frame projection. Since the amount of focus shift is essentially constant, and always in the same direction, the thickness of the optical compensating member required to correct the focusing may be fairly accurately determined. Normally, the thickness of the optical compensating member required is approximately three times the amount of the focus shift, assuming that the glass disc has an index of refraction of 1.5.

Objects and advantages other than those set forth above will be apparent from the following description when read in connection with the accompanying drawing, in which:

FIG. 1 is a schematic side elevation view partially in section of the projection system of a motion picture projector showing the position of the film and focus compensating mechanism during moving picture projection;

FIG. 2 is a segmental view of a portion of the structure of FIG. 1 showing the position of the buckled film and focus adjusting mechanism during single frame projection; and FIG. 3 is a segmental view in perspective of a film gate aperture plate upon which the focus adjusting mechanism is mounted.

Referring to the drawing, the normal projection system for a motion picture projector is shown in FIG. 1 as comprising a projection lamp 5, a reflector 8 for lamp 6, a pair of condenser lenses 10, a film gate 12, and an image focusing objective lens system 14. The light is reflected from lamp 6 along an optic path through condenser lenses 10 and a film 16 passing through film gate 12 for projecting an image from film 16 which is focused onto a projection screen, not shown. The film gate 12 is of the normal type having an aperture plate 18 and a pressure plate 20 between which film 16 is advanced by any suitable film pull-down mechanism, not shown. During normal projection of moving pictures, film 16 passing through film gate 12 assumes the position as shown in FIG. 1. However, when film 16 is stopped to project a single frame by any suitable single frame mechanism, not shown, the heat from projection lamp 6 drys out the layer of emulsion on the single frame causing the emulsion to shrink and the film to bend or buckle in the direction of the projection lamp. This, of course, causes a focus shift resulting in an out-of-focus picture on the screen. To compensate for this focus shift, an optical compensating member such as a glass plate 22 is mounted between film gate 12 and objective lens system 14 for movement between an inoperative position, in which it is out of the optic path, and an operative position, in which it is interposed in the optic path to bring the projected image of the single frame back in focus. Since the focus shift due to the heat is essentially a constant value of approximately three to four thousandths of an inch, it may be effectively compensated for by an optical compensating glass plate 22 of a fixed thickness, generally three to four times that of the focus shift based on a glass refraction index of 1.5. In this example, the glass thickness would be substantially ten thousandths of an inch.

This invention is applicable to moving picture projectors with or without heat absorbing plates for single frame projection. In projectors without heat absorbing plates, sufficient cooling air must be provided to prevent the film from burning during single frame projection.

Although many control mechanisms for moving glass plate 22 between its operative and inoperative positions are possible, one embodiment of such a mechanism is disclosed in FIG. 3. This control mechanism comprises an open-ended box 24 secured to pressure plate 20 of film gate 12 for slideably supporting a plate 26 to which glass plate 22 is secured by cement or the like. The plate 26 has an upturned lug 28 extending through a guide slot 30 in box 24. A spring 32 having one leg extending through an opening 34 in aperture plate 20, an intermediate portion wound about a post 36 on plate 20, and its other leg extending through an opening in lug 28, is tensioned to normally move plate 26 and glass plate 22 into its inoperative position, in which plate 22 is out of the optic path of the projector. An arm 38 is secured to a lever 40 of any well known manually operated speed control mechanism, for shifting the projector between a still position for single frame projection, and a forward position for projecting film at 18 frames per second. The end of arm 38 extends through a slot 42 in plate 20, and functions as an index in cooperation with indicia on plate 20 to indicate which position the projector is in. The arm 38 is held out of engagement with spring 32 when lever 40 is manually moved into its 18 frame per second position. However, when the lever is manually moved to the still position as seen in FIG. 3, lever 40 engages spring 32 and moves plates 22, 26 into their operative position. In this position, glass plate 22 is in the optic path and in register with the aperture in plate 20, and the film frame being projected.

The invention has been described in detail with particular reference to one embodiment thereof, but it will be understood that variations and modifications can be effected within the spirit and scope of the invention as described hereinabove, and as defined in the appended claims.

I claim:

1. A moving picture projector comprising:
 a film gate;
 means for transporting a film through said film gate;
 means for illuminating said film;
 an objective lens system defining an optic path and forming a projected film image onto a screen;
 control means for said film transporting means movable between a running position, in which said film is transported through said film gate along one path for projecting moving pictures in focus on said screen, and a still position, in which said film transport is stopped for projecting a single frame of film and said film assumes a different path in said film gate due to the heat from said projection lamp, causing the projected image to be shifted out of focus; and
 optical compensating means movable between a first position, in which said optical compensating means is held out of said optic path when said control means is in its running position, and a second position, in which said optical compensating means is interposed in said optic path between said film gate and objective lens system to correct said out of focus condition when said control means is in its still position.

2. The invention according to claim 1 wherein said optical compensating means is connected to said control means so that movement of said optical compensating means between its first and second positions is in response to movement of said control means between its running and still positions respectively.

3. The invention according to claim 2 wherein said optical compensating means comprises a glass plate.

4. The invention according to claim 3 wherein the distance the image is shifted out of focus is substantially constant, and said glass plate has an index of refraction of substantially 1.5, and has a thickness of substantially three times the distance the image is shifted out of focus.

5. The invention according to claim 2 wherein said film gate comprises an aperture plate, and said optical compensating means comprises a slider mounted for reciprocal movement on said aperture plate, a glass plate secured to one end of said slider, and a spring for said slider for normally urging said optical compensating means towards its first position, said spring being engageable by said control means for movement of said optical compensating means between its first and second positions.

References Cited

UNITED STATES PATENTS

| | | | |
|---|---|---|---|
| 1,584,186 | 5/1926 | Mitchell | 352—140 |
| 1,750,197 | 3/1930 | Schoen | 352—147 |
| 2,258,903 | 10/1941 | Mitchell | 352—140 |
| 2,869,421 | 1/1959 | Pokolic | 352—147 |
| 2,937,569 | 5/1960 | Wilton | 352—104 |
| 3,249,007 | 5/1966 | Stauffer | 352—140 |
| 3,342,102 | 9/1967 | Maxon | 352—140 |

FOREIGN PATENTS 642,677  5/1928  France.

JULIA E. COINER, *Primary Examiner.*

U.S. Cl. X.R.

352—147, 169, 180